United States Patent
Morrison et al.

(10) Patent No.: US 7,532,206 B2
(45) Date of Patent: May 12, 2009

(54) SYSTEM AND METHOD FOR DIFFERENTIATING BETWEEN POINTERS USED TO CONTACT TOUCH SURFACE

(75) Inventors: Gerald D. Morrison, Calgary (CA); David E. Holmgren, Calgary (CA)

(73) Assignee: Smart Technologies ULC (CA)

( * ) Notice: Subject to any disclaimer, the term of this patent is extended or adjusted under 35 U.S.C. 154(b) by 92 days.

(21) Appl. No.: 10/384,783

(22) Filed: Mar. 11, 2003

(65) Prior Publication Data

US 2004/0179001 A1 Sep. 16, 2004

(51) Int. Cl.
G06F 3/042 (2006.01)
G06F 3/041 (2006.01)
G06F 3/033 (2006.01)
G06F 3/037 (2006.01)
G06K 11/06 (2006.01)
G08C 21/00 (2006.01)
G09G 5/08 (2006.01)

(52) U.S. Cl. ............... 345/179; 178/18.01; 178/18.03; 178/18.09; 178/18.11; 345/157; 345/158; 345/173; 345/175; 345/180; 345/181; 345/182; 345/183

(58) Field of Classification Search ......... 345/157–158, 345/173, 175, 179–183
See application file for complete search history.

(56) References Cited

U.S. PATENT DOCUMENTS 4,144,449 A 3/1979 Funk et al.
4,507,557 A 3/1985 Tsikos .................. 250/341

(Continued)

FOREIGN PATENT DOCUMENTS

CA 2493236 A1 12/2003

(Continued)

OTHER PUBLICATIONS

"CCDs in optical touch panels deliver high resolution", Bud K. Funk, Electronic Design, Sep. 27, 1980, pp. 139-143.

(Continued)

*Primary Examiner*—Sumati Lefkowitz
*Assistant Examiner*—Alexander S. Beck
(74) *Attorney, Agent, or Firm*—Katten Muchin Rosenman LLP

(57) ABSTRACT

A touch system comprises a touch surface and at least one camera acquiring images of the touch surface. A pointer contact data generator generates pointer position data in response to pointer contact with the touch surface, the pointer position data representing where on the touch surface pointer contact is made. A processor communicates with the at least one camera and the pointer contact data generator. The processor analyzes acquired images to determine the type of pointer used to contact the touch surface, and processes the pointer position data in accordance with the determined type of pointer. In the preferred embodiment the processor distinguishes between pointer tip touch surface contacts, pointer backend touch surface contacts and finger touch surface contacts. A writing function is invoked in response to pointer tip touch surface contacts. An erase function is invoked in response to pointer backend touch surface contacts. Mouse events are generated in response to finger touch surface contacts.

43 Claims, 5 Drawing Sheets

U.S. PATENT DOCUMENTS

| | | | | |
|---|---|---|---|---|
| 4,558,313 A | * | 12/1985 | Garwin et al. | 345/179 |
| 4,742,221 A | | 5/1988 | Sasaki et al. | 250/221 |
| 4,746,770 A | | 5/1988 | McAvinney | 178/18 |
| 4,818,826 A | | 4/1989 | Kimura | 178/19 |
| 4,822,145 A | | 4/1989 | Staelin | |
| 5,097,516 A | | 3/1992 | Amir | |
| 5,317,140 A | | 5/1994 | Dunthorn | 250/221 |
| 5,359,155 A | | 10/1994 | Helser | |
| 5,448,263 A | | 9/1995 | Martin | |
| 5,483,261 A | | 1/1996 | Yasutake | |
| 5,484,966 A | | 1/1996 | Segen | |
| 5,502,568 A | | 3/1996 | Ogawa et al. | 356/375 |
| 5,528,263 A | | 6/1996 | Platzker et al. | |
| 5,554,828 A | | 9/1996 | Primm | |
| 5,581,276 A | | 12/1996 | Cipolla et al. | |
| 5,670,755 A | * | 9/1997 | Kwon | 178/18.05 |
| 5,729,704 A | | 3/1998 | Stone et al. | |
| 5,736,686 A | | 4/1998 | Perret, Jr. et al. | |
| 5,737,740 A | * | 4/1998 | Henderson et al. | 715/530 |
| 5,745,116 A | | 4/1998 | Pisutha-Arnond | |
| 5,771,039 A | | 6/1998 | Ditzik | |
| 5,818,424 A | | 10/1998 | Korth | |
| 5,819,201 A | | 10/1998 | DeGraaf | |
| 5,825,352 A | | 10/1998 | Bisset et al. | |
| 5,831,602 A | | 11/1998 | Sato et al. | |
| 5,911,004 A | | 6/1999 | Ohuchi et al. | |
| 5,914,709 A | | 6/1999 | Graham et al. | |
| 5,936,615 A | | 8/1999 | Waters | 345/173 |
| 5,943,783 A | | 8/1999 | Jackson | |
| 5,963,199 A | * | 10/1999 | Kato et al. | 345/179 |
| 5,982,352 A | | 11/1999 | Pryor | |
| 5,988,645 A | | 11/1999 | Downing | |
| 6,008,798 A | | 12/1999 | Mato, Jr. et al. | 345/168 |
| 6,100,538 A | | 8/2000 | Ogawa | 250/559.38 |
| 6,118,433 A | | 9/2000 | Jenkin et al. | |
| 6,153,836 A | | 11/2000 | Goszyk | |
| 6,161,066 A | | 12/2000 | Wright et al. | |
| 6,208,330 B1 | * | 3/2001 | Hasegawa et al. | 345/173 |
| 6,252,989 B1 | | 6/2001 | Geisler et al. | |
| 6,256,033 B1 | | 7/2001 | Nguyen | |
| 6,262,718 B1 | | 7/2001 | Findlay et al. | |
| 6,310,610 B1 | | 10/2001 | Beaton et al. | |
| 6,323,846 B1 | | 11/2001 | Westerman et al. | |
| 6,335,724 B1 | | 1/2002 | Takekawa et al. | 345/173 |
| 6,339,748 B1 | | 1/2002 | Hiramatsu | |
| 6,359,612 B1 | | 3/2002 | Peter et al. | |
| 6,414,671 B1 | | 7/2002 | Gillespie et al. | 345/157 |
| 6,421,042 B1 | | 7/2002 | Omura et al. | 345/157 |
| 6,429,856 B1 | | 8/2002 | Omura et al. | |
| 6,507,339 B1 | | 1/2003 | Tanaka | |
| 6,531,999 B1 | | 3/2003 | Trajkovic | 345/157 |
| 6,545,669 B1 | | 4/2003 | Kinawi et al. | |
| 6,563,491 B1 | | 5/2003 | Omura | 345/173 |
| 6,567,078 B2 | * | 5/2003 | Ogawa | 345/179 |
| 6,594,023 B1 | | 7/2003 | Omura et al. | |
| 6,630,922 B2 | | 10/2003 | Fishkin et al. | |
| 6,674,424 B1 | * | 1/2004 | Fujioka | 345/157 |
| 6,690,363 B2 | | 2/2004 | Newton | |
| 6,690,397 B1 | | 2/2004 | Daignault, Jr. | |
| 6,710,770 B2 | | 3/2004 | Tomasi et al. | |
| 6,774,889 B1 | | 8/2004 | Zhang et al. | |
| 6,803,906 B1 | | 10/2004 | Morrison et al. | |
| 6,864,882 B2 | | 3/2005 | Newton | |
| 6,933,981 B1 | | 8/2005 | Kishida et al. | |
| 6,972,401 B2 | | 12/2005 | Akitt et al. | |
| 6,972,753 B1 | | 12/2005 | Kimura et al. | |
| 7,007,236 B2 | | 2/2006 | Dempski et al. | |
| 7,030,861 B1 | | 4/2006 | Westerman et al. | |
| 7,202,860 B2 | * | 4/2007 | Ogawa | 345/175 |
| 7,274,356 B2 | | 9/2007 | Ung et al. | |
| 2001/0019325 A1 | | 9/2001 | Takekawa | 345/157 |
| 2001/0022579 A1 | | 9/2001 | Hirabayashi | 345/175 |
| 2001/0026268 A1 | | 10/2001 | Ito | 345/175 |
| 2001/0033274 A1 | * | 10/2001 | Ong | 345/173 |
| 2002/0036617 A1 | | 3/2002 | Pryor | |
| 2002/0050979 A1 | | 5/2002 | Oberoi et al. | |
| 2002/0163530 A1 | | 11/2002 | Takakura et al. | |
| 2003/0001825 A1 | | 1/2003 | Omura et al. | |
| 2003/0043116 A1 | | 3/2003 | Morrison et al. | |
| 2003/0063073 A1 | | 4/2003 | Geaghan et al. | |
| 2003/0071858 A1 | | 4/2003 | Morohoshi | |
| 2003/0085871 A1 | * | 5/2003 | Ogawa | 345/158 |
| 2003/0095112 A1 | | 5/2003 | Kawano et al. | |
| 2003/0151532 A1 | | 8/2003 | Chen et al. | |
| 2004/0021633 A1 | | 2/2004 | Rajkowski | |
| 2004/0046749 A1 | | 3/2004 | Ikeda | |
| 2004/0149892 A1 | | 8/2004 | Akitt et al. | |
| 2004/0178993 A1 | | 9/2004 | Morrison et al. | |
| 2004/0178997 A1 | | 9/2004 | Gillespie et al. | |
| 2004/0179001 A1 | | 9/2004 | Morrison et al. | |
| 2004/0189720 A1 | | 9/2004 | Wilson et al. | |
| 2005/0052427 A1 | | 3/2005 | Wu et al. | |
| 2005/0057524 A1 | | 3/2005 | Hill et al. | |
| 2005/0151733 A1 | | 7/2005 | Sander et al. | |
| 2005/0190162 A1 | | 9/2005 | Newton | |
| 2005/0248540 A1 | | 11/2005 | Newton | |
| 2006/0202953 A1 | | 9/2006 | Pryor et al. | |
| 2006/0274067 A1 | | 12/2006 | Hidai | |
| 2007/0075982 A1 | | 4/2007 | Morrison et al. | |
| 2007/0126755 A1 | | 6/2007 | Zhang et al. | |
| 2007/0236454 A1 | | 10/2007 | Ung et al. | |

FOREIGN PATENT DOCUMENTS

| | | |
|---|---|---|
| DE | 198 10 452 A1 | 12/1998 |
| EP | 0 279 652 A | 8/1988 |
| EP | 0347725 A2 | 12/1989 |
| EP | 0762319 A2 | 3/1997 |
| EP | 0829798 A2 | 3/1998 |
| JP | 57-211637 | 12/1982 |
| JP | 8-240407 | 9/1996 |
| JP | 9-91094 | 4/1997 |
| JP | 9-319501 | 12/1997 |
| JP | 10-105324 A | 4/1998 |
| JP | 2003-167669 A | 6/2003 |
| JP | 2003-173237 A | 6/2003 |
| JP | 2001-282456 A | 11/2007 |
| WO | 99/21122 A1 | 4/1999 |
| WO | WO 99/40562 | 8/1999 |
| WO | 02/03316 A1 | 1/2002 |
| WO | 02/27461 A1 | 4/2002 |
| WO | 03/105074 A2 | 12/2003 |

OTHER PUBLICATIONS

Bernhard P. Wrobel, "Minimum Solutions for Orientation", Calibration and Orientation of Cameras in Computer Vision, Springer Series in Information Sciences, vol. 34, 2001, pp. 28-33.

Kenichi Kanatani, "Camera Calibration", Geometric Computation for Machine Vision, Oxford Engineering Science Series, vol. 37, 1993, pp. 56-63.

Richard Hartley and Andrew Zisserman, "Multiple View Geometry in Computer Vision", Cambridge University Press, First published 2000, Reprinted (with corrections) 2001, pp. 70-73, 92-93, and 98-99.

Wolfgang Förstner, "On Estimating Rotations", Festschrift für Prof. Dr.-Ing. Heinrich Ebner zum 60. Geburtstag, Herausg.: C. Heipke und H Mayer, Lehrstuhl für Photogrammetrie und Fernerkundung, TU München, 1999, 12 pages. (http://www.ipb.uni-bonn.de/papers/#1999).

European Search Report for EP 06 01 9269 for a search that was completed on Nov. 9, 2006.

European Search Report for EP 06 01 9268 for a search that was completed on Nov. 9, 2006.

European Search Report for EP 02 25 3594 for a search that was completed on Dec. 14, 2005.

European Search Report for EP 04 25 1392 for a search that was completed on Jan. 11, 2007.

Wang, Fie-Yue, "Stereo camera calibration without absolute world coordinate information", SPIE, vol. 2620, pp. 655-662, Jun. 14, 1995.

Partial European Search Report for EP 03 25 7166 which was completed on May 19, 2006.

* cited by examiner

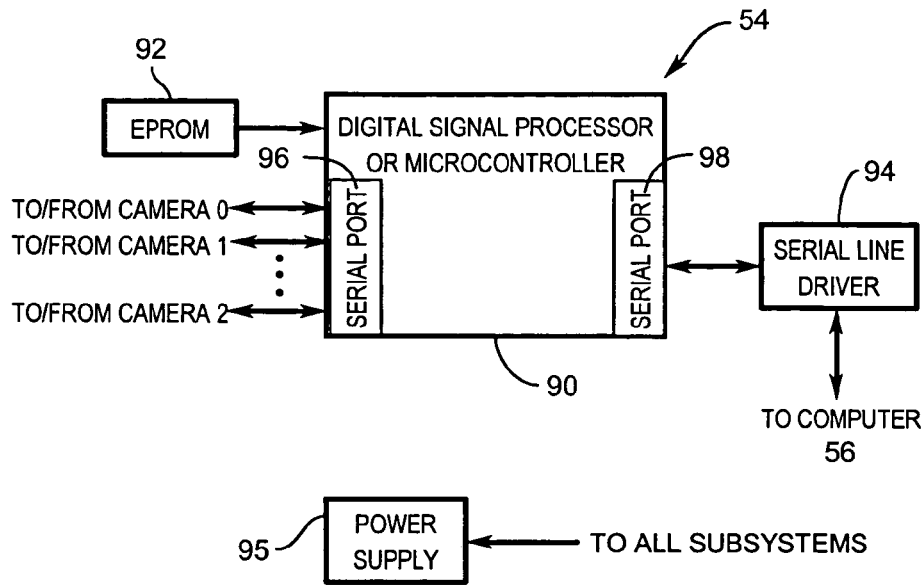
FIG. 4
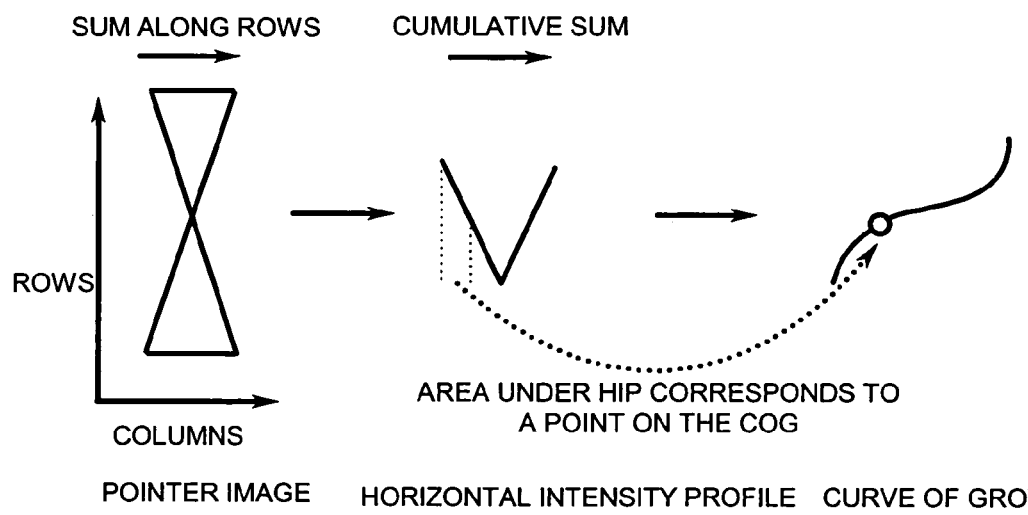
POINTER IMAGE
FIG. 5a
HORIZONTAL INTENSITY PROFILE
FIG. 5b
CURVE OF GROWTH
FIG. 5c

SYSTEM AND METHOD FOR DIFFERENTIATING BETWEEN POINTERS USED TO CONTACT TOUCH SURFACE

FIELD OF THE INVENTION

The present invention relates generally to touch systems and in particular to a touch system and method for differentiating between pointers used to contact a touch surface.

BACKGROUND OF THE INVENTION

Touch systems are well known in the art and typically include a touch screen having a touch surface on which contacts are made using a pointer. Pointer contacts with the touch surface are detected and are used to generate corresponding output pointer position data representing areas of the touch surface where the pointer contacts are made. There are basically two general types of touch systems available and they can be broadly classified as "active" touch systems and "passive" touch systems.

Active touch systems allow a user to generate pointer position data by contacting the touch surface with a special pointer that usually requires some form of on-board power source, typically batteries. The special pointer emits signals such as infrared light, visible light, ultrasonic frequencies, electromagnetic frequencies, etc. that activate the touch surface.

Passive touch systems allow a user to generate pointer position data by contacting the touch surface with a passive pointer and do not require the use of special pointers in order to activate the touch surface. A passive pointer can be a finger, a cylinder of some material, or any other suitable object that can be used to contact some predetermined area of interest on the touch surface. Since special active pointers are not necessary in passive touch systems, battery power levels and/or pointer damage, theft, or pointer misplacement are of no concern to users.

Although passive touch systems provide advantages over active touch systems, many prior art passive touch systems suffer disadvantages in that they are generally not able to tell what type of pointer is used to contact the touch surface i.e. whether a contact is made using a finger, stylus, pen, or the like.

To deal with this shortcoming, techniques have been considered to provide the ability to differentiate between pointers used to contact a touch surface. For example, U.S. Pat. No. 5,448,263 to Martin, assigned to SMART Technologies, Inc., assignee of the present invention, discloses a passive touch system including an analog resistive touch screen coupled to a computer. Image data generated by the computer is conveyed to a projector, which in turn projects a corresponding image on the touch surface of the touch screen. When a user contacts the touch surface of the touch screen, the touch screen generates pointer position data that is conveyed to the computer. Depending on the mode of operation of the touch system, the computer either records the pointer position data as writing or uses the pointer position data to control execution of an application programs executed by the computer. The computer also updates the image data so that the image presented on the touch surface by the projector reflects the pointer activity.

To assist the user in making pointer contacts on the touch surface, a tool tray is disposed adjacent the bottom edge of the touch surface. The tool tray includes a number of slots, each slot of which accommodates a different colored pen. When a pen is lifted from its slot, the touch screen generates pen color data that is conveyed to the computer allowing the computer to determine the color of the lifted pen. With the pen color known, when the touch system is in a write mode and the pen is used to contact the touch surface, the computer uses the pointer position data and the pen color data to update the image data so that writing in the color of the selected pen is projected onto the touch surface.

International PCT Application No. PCT/CA01/00980 filed on Jul. 5, 2001 and published under number WO 02/03316 on Jan. 10, 2002, assigned to SMART Technologies, Inc., assignee of the present invention, discloses a camera-based touch system comprising a touch screen that includes a passive touch surface on which a computer-generated image is presented. A rectangular bezel or frame surrounds the touch surface and supports digital cameras at its corners. The digital cameras have overlapping fields of view that encompass and look along the touch surface. The digital cameras acquire images of the touch surface from different locations and generate image data. The image data acquired by the cameras is processed by digital signal processors to determine if a pointer exists in the captured image data. When it is determined that a pointer exists in the captured image data, the digital signal processors convey pointer characteristic data to a master controller, which in turn processes the pointer characteristic data to determine the location of the pointer relative to the touch surface using triangulation. The pointer location data is conveyed to a computer executing one or more application programs. The computer uses the pointer location data to update the computer-generated image that is presented on the touch surface. Pointer contacts on the touch surface can therefore be recorded as writing or used to control execution of an application program executed by the computer. Similar to the touch system disclosed in U.S. Pat. No. 5,448,263, the camera-based touch system also includes a tool tray accommodating a number of different colored pens that provides pen color data to the computer when a pen is lifted from the tool tray.

Although the above touch systems provide for discrimination between different color pens confusion can occur. For example, if a user lifts a pen from its slot in the tool tray and then uses a finger to write on the touch surface with the pen slot vacant, the computer will treat the pointer position data generated by the touch screen in response to the finger contact as if the pointer position data was generated in response to contacts made using the lifted pen.

Touch systems that treat pointer position data differently depending on the areas of the touch surface where contacts are made also exist. In these touch systems, when a computer desktop image is projected onto the touch surface, areas on the touch surface where inherent computer operating display elements such as tool bars, icons etc. are presented, are treated as non-active areas. Pointer contacts on the touch surface over the non-active areas are treated as mouse events irrespective of the type of pointer used to contact the touch surface. Pointer contacts on the touch surface within active areas are treated as writing. Although this type of touch system allows pointer contacts to be differentiated, differentiation of the pointer contacts is based on the areas of the touch surface where contacts are made and not based on pointer type. As will be appreciated touch systems that provide for better differentiation between pointers used to contact touch surfaces are desired.

It is therefore an object of the present invention to provide a novel touch system and method for differentiating between pointers used to contact a touch surface.

SUMMARY OF THE INVENTION

According to one aspect of the present invention there is provided a touch system comprising:

a touch surface to be contacted by a pointer;

at least one imaging device having a field of view looking generally along said touch surface; and at least one processor communicating with said at least one imaging device and analyzing images acquired by said at least one imaging device to: (i) determine the type of pointer used to contact said touch surface; and (ii) determine the location on said touch surface where pointer contact is made.

According to another aspect of the present invention there is provided a method of updating image data used to present a displayed image on a touch surface in response to pointer contact on said touch surface, said method comprising the steps of:

displaying an image on said touch surface;

generating pointer position data in response to pointer contact with said touch surface and acquiring images of pointers used to contact said touch surface;

analyzing the acquired images to determine the type of pointer used to contact the touch surface; and updating image data used to present the displayed image on said touch surface based on the generated pointer position data and the determined type of pointer.

According to yet another aspect of the present invention there is provided in a touch system including a touch surface, at least one pen tool to contact said touch surface, a processor recording data generated in response to contacts made on said touch surface using said at least pen tool and a camera to acquire an image of said at least one pen tool when said at least one pen tool is generally in contact with said touch surface, a method of updating recorded data comprising the steps of:

examining the acquired image to determine which end of the at least one pen tool is used to contact the touch surface; and modifying the recorded data based on the end of the at least one pen tool that is used to contact the touch surface.

According to yet another aspect of the present invention there is provided in a touch system including a touch surface on which an image is presented, a processor responsive to contacts made on the touch surface using a pointer and generating image data used to present said image, a method of updating said image data comprising the step of:

assessing a pointer attribute to determine the type of pointer used to make said contacts; and updating the image data based on the type of pointer and the pointer activity on the touch surface.

According to still yet another aspect of the present invention there is provided a touch system comprising:

a touch surface on which an image is presented; and a processor responsive to pointer contacts on the touch surface and generating image data that is used to present said image, said processor assessing a pointer attribute to determine the type of pointer used to make contacts and updating the image data based on the type of pointer and the pointer activity on the touch surface.

According to still yet another aspect of the present invention there is provided a camera-based touch system comprising:

a pair of cameras at spaced locations having overlapping fields of view encompassing an area on which pointer contacts are to be made, said cameras acquiring images and generating corresponding image data; and a processor receiving and processing the image data generated by said cameras to determine the location of a pointer relative to the area when the pointer is captured in images acquired by the cameras and analyzing the image data to determine the type of pointer used to contact the area.

According to still yet another aspect of the present invention there is provided an interactive input system comprising:

at least one imaging device having an input region within its field of view into which a pointer is moved to generate user input; and at least one processor communicating with said at least one imaging device and analyzing each image acquired by said at least one imaging device to determine the type of pointer moved into said input region.

The present invention provides advantages in that the type of pointer used to contact the touch surface is determined automatically. This enables the touch system to differentiate between contacts made on the touch surface using a finger and pen tool accurately and quickly. As a result, a user is provided with the ability to write, draw or annotate with a pen tool and then immediately use a finger to generate mouse events and manipulate the pen tool input without having to put the pen tool down. This provides the user with a seamless ability to write into and control application programs without purposefully having to change the mode of operation of the touch system prior to initiating touch events with different pointers.

Furthermore, since the type of pointer used to contact the touch surface is determined automatically, the need for tool tray electronics that generate pointer color data when a pointer is lifted from the tool tray is reduced or eliminated. This of course reduces costs.

In addition, since pointer contacts and pointer type are determined from images, multiple simultaneous contacts on the touch surface using different pointers can be determined.

The present invention also provides advantages in that since the touch system is able to differentiate between pointer tip and pointer backend contacts with the touch surface, different functions can be assigned to opposite ends of a pointer. As a result, a single pointer can be used to perform both a writing function and an erase function without purposefully having to change the mode of operation of the touch system. Using a pointer backend to initiate an erase function is of course highly user intuitive. Providing identifying glyphs on or shaping the tips of different pointers uniquely also allows different attributes, such as colors assigned to the different pointers, to be determined automatically.

BRIEF DESCRIPTION OF THE DRAWINGS

Embodiments of the present invention will now be described more fully with reference to the accompanying drawings in which:

FIG. 4 is a schematic diagram of a master controller forming part of the touch system of FIG. 1;

FIGS. 5a, 5b and 5c show the steps performed by the computer during computation of a curve of growth;

DETAILED DESCRIPTION OF THE PREFERRED EMBODIMENTS

The present invention relates to a touch system and method that differentiates between pointers used to contact a touch surface so that pointer position data generated in response to a pointer contact with the touch surface can be processed in accordance with the type of pointer used to contact the touch surface. The touch system includes a touch surface to be contacted by a pointer and at least one imaging device having a field of view looking generally along the touch surface. At least one processor communicates with the at least one imaging device and analyzes images acquired by the at least one imaging device to determine the type of pointer used to contact the touch surface and the location on the touch surface where pointer contact is made. The determined type of pointer and the location on the touch surface where the pointer contact is made are used by a computer to control execution of an application program executed by the computer. Preferred embodiments of the present invention will now be described with reference to FIGS. 1 to 10.

Figure 1:
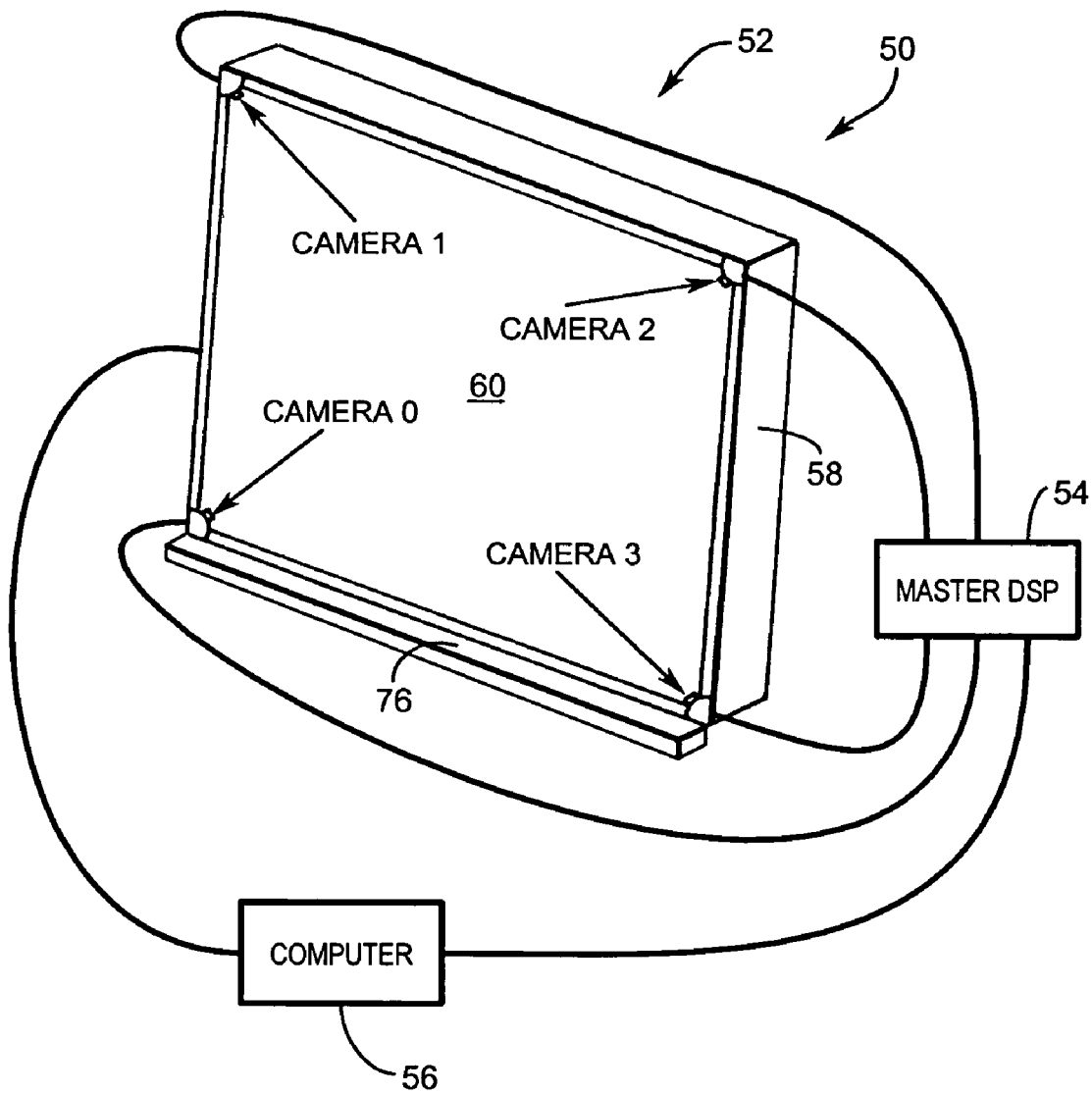
FIG. 1 is a schematic diagram of a camera-based touch system in accordance with the present invention.
Figure 2:
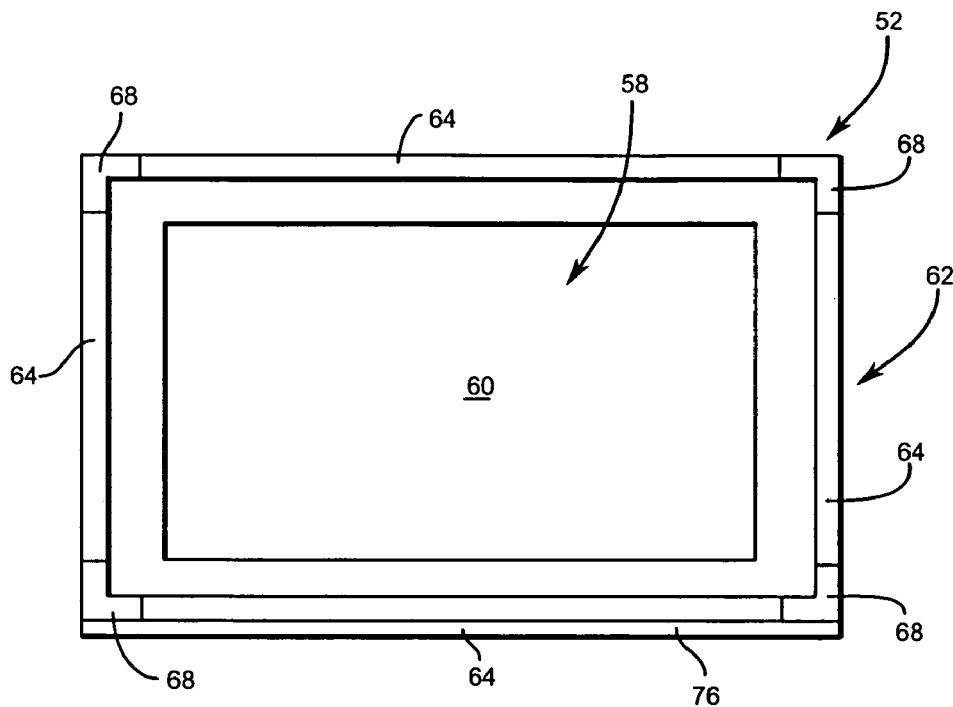
FIG. 2 is a front elevation view of a touch screen forming part of the touch system of FIG. 1.

Turning now to FIGS. 1 and 2, a camera-based touch system in accordance with the present invention is shown and is generally identified by reference numeral 50. Camera-based touch system 50 is similar to that disclosed in U.S. patent application Ser. No. 10/354,168 for an invention entitled "Illuminated Bezel and Touch System Incorporating Same" filed on Jan. 30, 2003 assigned to SMART Technologies Inc., assignee of the present invention, the content of which is incorporated herein by reference. As can be seen, touch system 50 includes a touch screen 52 coupled to a digital signal processor (DSP) based master controller 54. Master controller 54 is also coupled to a computer 56. Computer 56 executes one or more application programs and provides computer-generated image output that is presented on the touch screen 52. The touch screen 52, master controller 54 and computer 56 form a closed-loop so that pointer contacts with the touch screen 52 can be recorded as writing or drawing or used to control execution of an application program executed by the computer 56.

FIG. 2 better illustrates the touch screen 52. Touch screen 52 in the present embodiment includes a high-resolution display device such as a plasma display 58, the front surface of which defines a touch surface 60. The touch surface 60 is bordered by an illuminated bezel or frame 62 coupled to the display device. Illuminated bezel 62 includes elongate side frame assembly 64 that are coupled to the sides of the plasma display 58. Each side frame assembly 64 accommodates a generally continuous illumination source (not shown). The ends of the side frame assembly 64 are joined by corner pieces 68 that house DSP-based CMOS digital cameras 70 (see FIG. 3). Each digital camera is mounted within its respective corner piece 68 so that its field of view encompasses and looks across the entire touch surface 60.

Figure 6A:
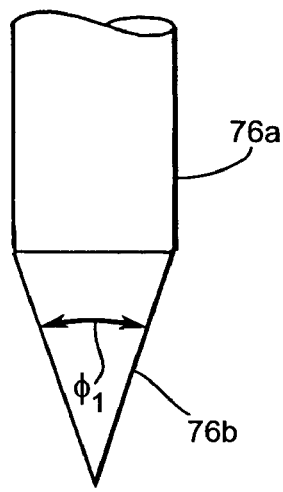
FIGS. 6a and 6b are elevation views of pen tools forming part of the touch screen of FIG. 2.
Figure 6B:
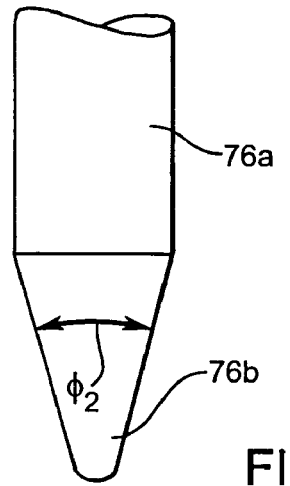

A tool tray 76 is positioned adjacent the bottom edge of the touch surface 60 and accommodates a plurality of different color pointers in the form of pen tools 76a used to contact the touch surface 60 as shown in FIGS. 6a and 6b. Each pen tool has a generally conical tip 76b defining an opening angle ø. The opening angle is an invariant property of the pen tool irrespective of the pen tool orientation when captured in an image. In the present embodiment, the tool tray 76 is passive and simply provides a convenient location to place the pen tools. If desired however, the tool tray 76 may include active functionality.

Figure 3:
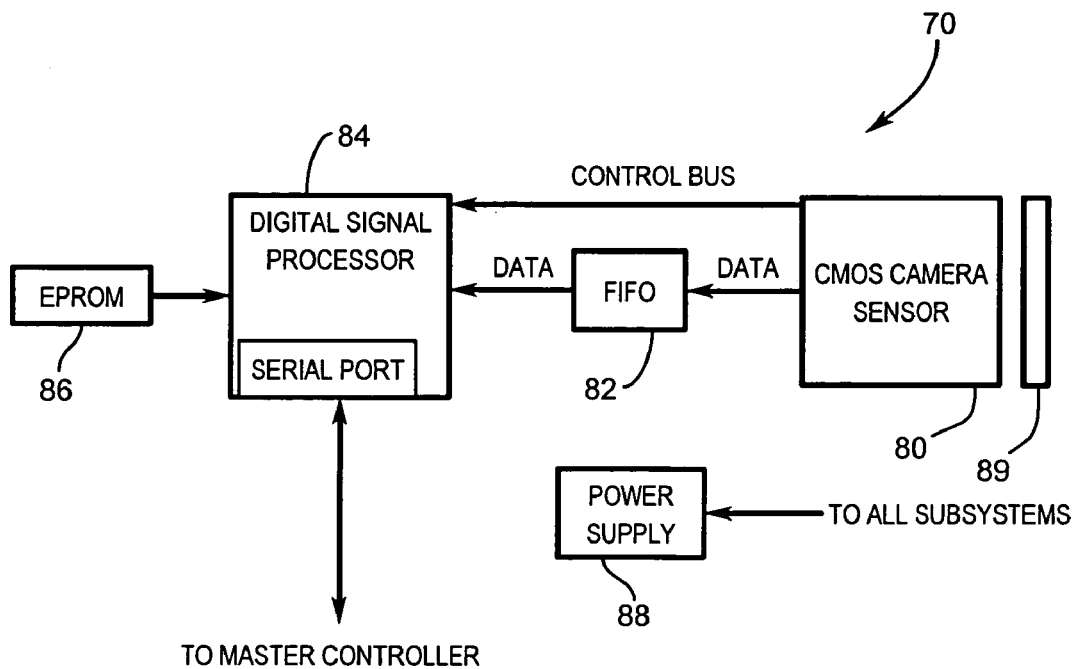
FIG. 3 is a schematic diagram of a digital camera forming part of the touch screen of FIG. 4.

One of the digital cameras within a corner piece 68 is shown in FIG. 3. As can be seen, each digital camera 70 includes a two-dimensional CMOS image sensor and associated lens assembly 80, a first-in-first-out (FIFO) buffer 82 coupled to the image sensor and lens assembly 80 by a data bus, and a digital signal processor (DSP) 84 coupled to the FIFO 82 by a data bus and to the image sensor and lens assembly 80 by a control bus (see FIG. 4). A boot EPROM 86 and a power supply subsystem 88 are also included. In the present embodiment, the CMOS camera image sensor is configured for a 20×648 pixel subarray that can be operated to capture image frames at rates in excess of 200 frames per second since arbitrary pixel rows can be selected. Also, since the pixel rows can be arbitrarily selected, the pixel subarray can be exposed for a greater duration for a given digital camera frame rate allowing for good operation in dark rooms as well as in lit rooms.

The DSP 84 provides control information to the image sensor and lens assembly 80 via the control bus. The control information allows the DSP 84 to control parameters of the image sensor and lens assembly 80 such as exposure, gain, array configuration, reset and initialization. The DSP 84 also provides clock signals to the image sensor and lens assembly 80 to control the frame rate of the image sensor and lens assembly 80.

An infrared pass filter 89 is provided on the digital camera image sensor and lens assembly 80 to blind the digital camera 70 to frequencies of light other than the light broadcasted by the illuminated bezel 62.

Master controller 54 is best illustrated in FIG. 4 and includes a DSP 90, a boot EPROM 92, a serial line driver 94 and a power supply subsystem 95. The DSP 90 communicates with the DSPs 84 of the digital cameras 70 over a data bus via a serial port 96 and communicates with the computer 56 over a data bus via a serial port 98 and the serial line driver 94.

The master controller 54 and each digital camera 70 follow a communication protocol that enables bi-directional communications via a common serial cable similar to a universal serial bus (USB). The transmission bandwidth is divided into thirty-two (32) 16-bit channels. Of the thirty-two channels, six (6) channels are assigned to each of the DSPs 84 in the digital cameras 70 in to the DSP 90 and the master controller 54 and the remaining two (2) channels are unused. The master controller 54 monitors the twenty-four (24) channels assigned to the DSPs 84 while the DSPs 84 monitor the six (6) channels assigned to the DSP 90 of the master controller 54. Communications between the master controller 54 and the digital camera 70 are performed as background processes in response to interrupts.

The operation of the touch system 50 will now be described. Each digital camera 70 acquires images looking along the touch surface 60 within the field of view of its image sensor and lens assembly 80 at a desired frame rate and processes each acquired image to determine if a pointer is in the acquired image. During image capture, the illuminated bezel provides adequate backlighting for the digital cameras

70. If a pointer is in the acquired image, the image is further processed to determine characteristics of the pointer contacting or hovering above the touch surface 60 such as pointer type. Pointer information packets (PIPs) including pointer characteristics, status and/or diagnostic information are then generated by the digital camera 70 and the PIPs are queued for transmission to the master controller 54. The digital cameras 70 also receive and respond to command PIPs generated by the master controller 54.

The master controller 54 polls the digital cameras 70 for PIPs. If the PIPs include pointer characteristic information, the master controller 54 triangulates pointer characteristics in the PIPs to determine the position of the pointer relative to the touch surface 60 in Cartesian rectangular coordinates and the type of pointer used to contact the touch surface 60. The master controller 54 in turn transmits calculated pointer position data, pointer type data, status and/or diagnostic information to the computer 56. In this manner, the pointer position data transmitted to the computer 56 can be recorded as writing or drawing or can be used to control execution of an applications program executed by the computer 56 depending on the type of pointer used to contact the touch surface 60. The computer 56 also updates the computer-generated image output conveyed to the plasma display 58 so that the information presented on the touch surface 60 reflects the pointer activity.

The master controller 54 also receives commands from the computer 56 and responds accordingly as well as generates and conveys commands to the digital camera 70. Specifics concerning the triangulation of pointer characteristics in PIPs are described in PCT Application No. WO 02/03316, assigned to SMART Technologies, Inc., assignee of the present invention, the content of which is incorporated herein by reference. Accordingly, specifics will not be described herein.

To enable automatic pointer discrimination, each DSP 84 is programmed to analyze the acquired images to determine whether a pen tool, or a finger is used to contact the touch surface 60. Each DSP 84 reports the determined pointer type to the master controller 54, which in turn reports the pointer type and pointer position to the computer 56. In this manner, since each DSP 84 can differentiate between the types of pointers used to contact the touch surface 60, the function assigned to each pointer can be determined from the images acquired by the digital cameras 70. This allows the computer 56 to process the pointer position and pointer type data and update the image data in the appropriate manner.

In order to determine the type of pointer used to contact the touch surface 60 from the images acquired by the digital cameras 70, each DSP 84 uses a curve of growth method to differentiate between different pointers. During this method, a horizontal intensity profile (HIP) is formed by calculating a sum along each row of pixels in the images (FIG. 5a) thereby to produce a one-dimensional profile having a number of points equal to the row dimension of the image (see FIG. 5b). A curve of growth is then generated from the HIP by forming the cumulative sum from the HIP (FIG. 5c). In other words, starting at the left most point of the HIP, a successive integration of the HIP from the left most point of the HIP to the right most point of the HIP is performed. The resulting integrated area corresponds to a specific point on the curve of growth. For a pen tool, the curve of growth has a distinct non-linear shape, while for a finger tip, the curve of growth is very close to linear. This is due to the fact that the tip of the pen tool is generally conical whereas a fingers tip is generally cylindrical. To distinguish between non-linear and linear curves of growth, a least-squares line is fitted to the curve of growth, the linear trend from the curve of growth is subtracted and the sum of squares of residuals (otherwise known as $2v\chi$) is formed. The sum of squares of residuals is defined as:

$$X_v^2 = \frac{1}{N-2} \sum_{i=1}^{N} [COG - CALC]^2$$

The factor of N−2 is the number of degrees of freedom for a linear fit to N points. This number reduces the problem of pointer-finger recognition to just examining the value of the sum of squares of residuals. If the sum of squares of residuals is close to 1, then a finger tip is present while if it is much larger than a pen tool is present.

In the present embodiment, when the DSPs 84 identify the pointer that is used to contact the touch surface as a finger, the computer 56 treats the pointer contact as a mouse event. In this manner, a user is able to use a finger to manipulate (i.e. move, resize etc.) pen tool writing or control execution of an applications program with a pen tool in hand without having to change the mode of operation of the touch screen 52. When the DSPs 84 identify the pointer that is used to contact the touch surface as a pen tool, the computer 56 treats the pointer position data as writing.

If desired, different pen tools can be provided with uniquely shaped conical tips and assigned different attributes, each conical tip having a unique opening angle as shown in FIGS. 6a and 6b. In this case, if a pen tool is used to contact the touch surface 60, the DSPs 84 further analyze the images to recognize the unique shape of the pen tool tip.

To differentiate between different pen tools, the curves of growth are examined. Since the tip of each pen tool has its own unique shape, the curve of growth generated for each pen tool is different. This allows different pen tools used to contact the touch surface 60 to be determined. For example, if each pen tool is assigned a different color, the unique curve of growth generated for each pen tool can be used to assign the appropriate color to the pen tool so that writing made on the touch surface 60 using each pen tool appears in the appropriate color.

Although the pen tools are described as having conical tips with different opening angles, the various pen tools can be formed with different shaped tips of virtually any configuration that result in unique curves of growth being generated to provide for pointer discrimination.

Although the operation of the touch system is described with reference to single contacts made on the touch surface 60, as will be appreciated by those skilled in the art, since camera images are used to determine pointer contacts, multiple pointer contacts on the touch surface 60 can be determined since each pointer will appear in the images captured by each camera. The type of each pointer can be determined in the same manner described above and used during processing of the resulting pointer location data. In this manner a user may contact the touch surface simultaneously with different color pen tools or with a pen tool an a finger.

Figure 7A:
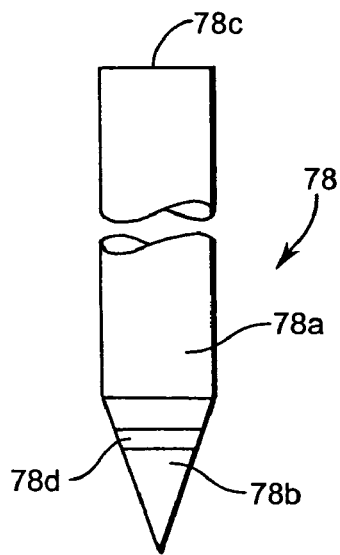
FIGS. 7a and 7b are elevation views of alternative pen tools forming part of the touch screen of FIG. 2.
Figure 7B:
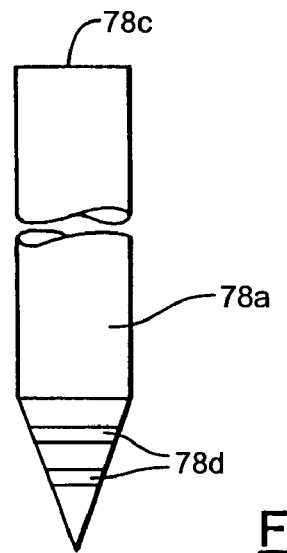
Figure 10:
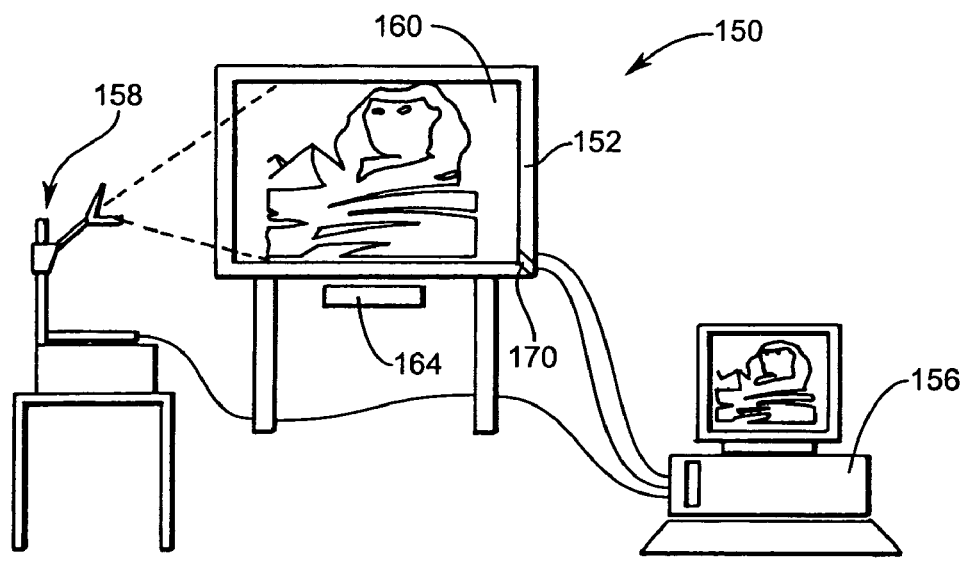
FIG. 10 is a schematic diagram of an alternative embodiment of a touch system in accordance with the present invention.
Figure 8A:
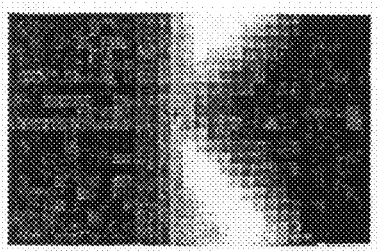
FIGS. 8 and 9 show typical fitting results generated by a computer forming part of the touch system of FIG. 1 in response to touch surface contacts made using a pen tool and finger, respectively.
Figure 8B:
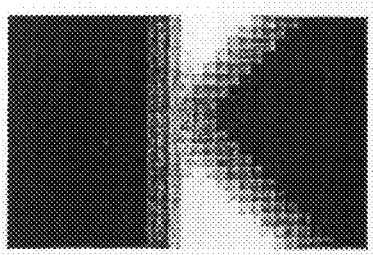
Figure 8C:
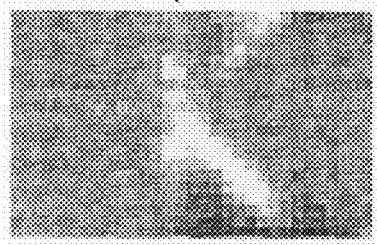
Figure 8D:
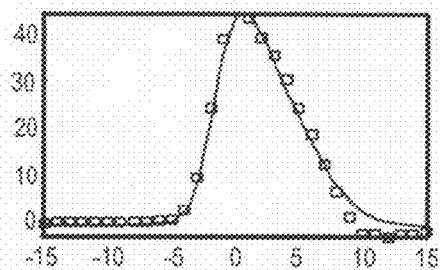
Figure 9A:
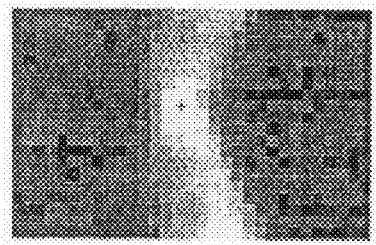
Figure 9B:
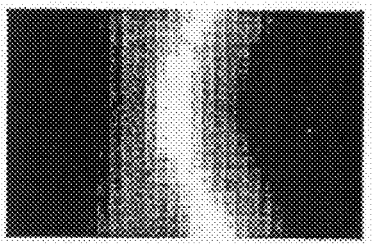
Figure 9C:
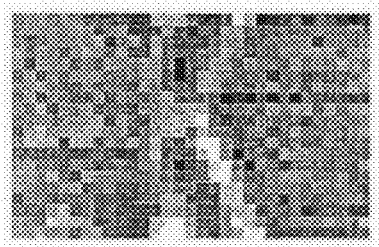
Figure 9D:
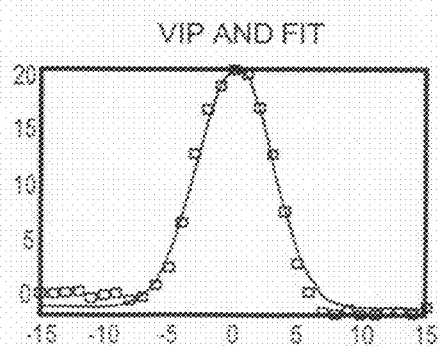

FIGS. 7a and 7b show alternative pen tools 78. In this embodiment, each pen tool 78 includes a cylindrical body 78a having a generally conical tip 78b at one end and a square backend 78c. A glyph or distinguishing mark 78d is provided on the pen tool 78 adjacent its tip 78b. The glyph 78d on each pen tool is different and represents a unique attribute, such as color, assigned to the pen tool. For example, in the present embodiment, the red pen tool has a single V-shaped groove on its tip 78b turned along the axis of the pen tool. The blue pen has two V-grooves on its tip 78b turned along the axis of the pen tool. The green pen has three V-shaped grooves on its tip 78b turned along the axis of the pen tool. The black pen tool is devoid of a glyph on its tip 78b. If the touch screen 52 includes additional different colored pen tools, different shaped glyphs are provided on the tips of these additional pen tools to allow the touch system 50 to determine their colors.

In this embodiment, rather than relying on curves of growth to differentiate between the pointer used to contact the touch surface, each DSP 84 uses an artificial neural network (ANN) to determine the type of pointer used to contact the touch surface 60 from the images. As is well known ANN's are ideally suited to solving problems of an ambiguous nature such as multi-parameter target detection when the parameters are not known. There are no specific algorithms, procedures, or rules that are pre-programmed in an ANN, rather only a training method. The training method allows the ANN to establish its own set of parameters and rules to solve the pattern recognition problem.

In the present embodiment, the ANN is specifically trained to analyze the images acquired by the digital cameras 70 and recognize whether a pointer tip, a pointer backend, or a finger is used to contact the touch surface 60. During the analysis of each camera image, the ANN generates decision output that identifies the pointer used to contact the touch surface 60 with some degree of probability. For each set of images acquired by the digital cameras 70, the ANN decision output with the highest degree of probability is used by the computer 56.

When the ANN decision output identifies the pointer that is used to contact the touch surface 60 as a finger, the computer 56 treats the pointer contact data as a mouse event. In this manner, a user is able to use a finger to manipulate (i.e. move, resize etc.) pen tool writing input or control execution of application programs with a pen tool in hand without having to change the mode of operation of the touch screen. When the ANN decision output identifies the pointer that is used to contact the touch surface 60 as a pointer backend 78c, the computer 56 treats the pointer as an erase tool. The pointer backend makes a nice intuitive erase tool because the pen tool itself works like a pencil, its shape is distinct and it avoids the need for pointers to be switched in order to perform an erase function.

When the ANN decision output identifies the pointer that is used to contact the touch surface 60 as a pointer tip 78b, the computer 56 treats the pointer position data as writing or drawing. In order to determine the color to be assigned to the writing or drawing, the ANN further analyses the images acquired by the digital cameras 70 to recognize the glyph 78d on the pointer tip 78b, since the glyph on the pointer tip represents the color assigned to the pen tool.

During image analyses, a model fitting approach is used wherein each gray-level value at each pixel (i.e., (x,y) location) of a difference image is described by a model of several parameters. These model parameters include:

the mean gray level within the pointer, and that in the background;

the (x, y) location of the pointer tip 78b;

the orientation angles of the leading and trailing edges of the pointer tip; and the resolution of the digital cameras 70 used to acquire the images.

The mathematical model functions are combinations of Gaussian error functions as disclosed by Blaszka, T. and Deriche, R. in "Recovering and Characterizing Image Features Using an Efficient Model Based Approach", 1994, Rapport de recherche No. 2422, INRIA. Images are compared pixel-by-pixel, in order to fit the model to the image Statistically, this comparison is performed using the reduced chi-squared statistic $$\chi_v^2 = \frac{1}{N-M} \sum_{i,j} [\, I_{i,j}^{obs} - I_{i,j}^{calc} \,]^2$$

Here, $v=N-M$ is the number of degrees of freedom, i.e., the number of data points minus the number of parameters being fitted. To find the best-fit set of parameters, $\chi_v^2$ is minimized with respect to these parameters.

The minimization may be computed in any number of ways, but the most effective methods are Levenberg-Marquardt (LM), and Variable metric (VM). Both methods need the derivatives of $\chi_v^2$ with respect to each of the model parameters at each point on the image. As the model functions are nonlinear, these derivatives are best computed numerically, using either centered differences:

$$\frac{\partial f}{\partial x} = \frac{f(x+h) - f(x-h)}{2h}$$

or forward differences:

$$\frac{\partial f}{\partial x} = \frac{f(x+h) - f(x)}{h}$$

Here, $h \Box 10^{-4}$ is a small number added to each parameter. So, at each point we compute the gradient of $\chi_v^2$:

$$\nabla \chi_v^2 = \left[ \frac{\partial \chi_v^2}{\partial A} \quad \frac{\partial \chi_v^2}{\partial B} \quad \frac{\partial \chi_v^2}{\partial x_0} \quad \frac{\partial \chi_v^2}{\partial y_0} \quad \frac{\partial \chi_v^2}{\partial \theta_1} \quad \frac{\partial \chi_v^2}{\partial \theta_2} \quad \frac{\partial \chi_v^2}{\partial \sigma} \right]$$

In the LM method, this gradient forms one row of the Jacobian matrix J. Assume for the moment that there is some initial set of parameters p which will allow J to be computed for the whole image. To improve this initial estimate, the LM method requires the solution of the matrix equation:

$$[J^T J + \lambda I] \Delta p = -J^T r$$

for the correction vector $\Delta p$, i.e., $$p_{new} = p_{old} + \Delta p$$

Here, r is the residual vector, the difference between the observed and computed image brightness at each pixel. Effectively, this residual vector drives the solution process. The LM parameter $\lambda$ is used to govern the convergence of this iterative procedure; if the magnitudes of the residuals are increasing, $\lambda$ is increased, otherwise it decreases as the best-fit solution for p is approached. The LM method is a fast and robust procedure. However, it requires the storage and manipulation of some rather large matrices.

The VM method solves this problem in a convenient way; it constructs directly a matrix similar to:

$$[J^T J + \lambda I]^{-1}$$

known as the inverse Hessian. The Hessian itself rigorously is the matrix of all second derivatives of $\chi_v^2$ with respect to all of the model parameters. In other words, the calculation $$p_{new} = p_{old} + H^{-1} \Delta p$$

is done by constructing $H^{-1}$ directly from $\nabla \chi_\nu^2$. The only minor drawback to this approach is that one must now use a line search to get $\Delta p$ (and hence $H^{-1}$) at each iteration, which means numerous evaluations of $\chi_\nu^2$ (but not its gradient). The VM method takes several iterations to converge, but each iteration is much faster than a single LM iteration.

The VM and LM iterative non-linear least-squares techniques adjust all of the model parameters simultaneously and have been found to:

locate the pointer tip or finger with a precision of approximately 0.1 pixel;

segment reliably the pointer tip or finger from the background; and recognize reliably the type of pointer through the model resolution parameter.

These iterative non-linear least-squares techniques have also been found to yield sharper images when a pointer tip is used to contact the touch system as compared to when a finger is used to contact the touch surface, in terms of the model resolution parameter. This difference in image sharpness is due to the fact that the model describes the pointer as a corner, i.e., two straight lines connected at a common vertex and separated by a given angle. As will be appreciated, this model description fits the shape of a conical pointer tip much better than it does a finger. To compensate for this difference in image sharpness, the iterative non-linear least-squares technique adjusts the model resolution parameter accordingly. In other words, the iterative non-linear least-squares technique smoothes the corner in order to better approximate a finger shape. The end result is that the model resolution parameter tends statistically to be larger for fingers than for pen tools. The following is a typical result for the mean model resolution parameter:

$\langle \sigma \rangle = 1.62 \pm 0.31$ (pen)

$\langle \sigma \rangle = 2.18 \pm 0.24$ (finger)

where the units of measurement are pixels. These results were found by analyzing ten images at random from two video sequences (which typically contain 250 to 500 frames). Similar results were found for four other video sequences. FIGS. 8 and 9 show typical fittings generated by a MATLAB simulation in response to touch surface contacts made using a pen tool and a finger, respectively. Note that a larger value of $\chi_\nu^2$ is more an indication that the model assumptions have been broken in some way (i.e., it is not possible to model every light variation seen in an image).

Although the present technique to differentiate between pointers used to contact a touch system is described as being incorporated in a touch system that uses camera images to generate pointer position data, those of skill in the art will appreciate that the technique may be used in other interactive environments. For example, turning now to FIG. 10, a touch system similar to that disclosed in U.S. Pat. No. 5,448,263 to Martin, assigned to the assignee of the present invention, is shown. As can be seen, touch system 150 includes an analog resistive touch screen 152 having a touch surface 160 on which computer-generated images are projected. A pointer tray 164 is provided along the bottom edge of touch surface 160 and holds pointers in the form of pen tools that are used to contact the touch surface 160. The pointer tray 164, similar to the previous embodiment, simply provides a convenient location to store pen tools. A camera 170 that is aimed generally along the plane of the touch surface 160 is provided adjacent one side of the touch surface and captures images.

When a pointer contact is made on the touch surface 160, the touch screen 152 generates pointer position data output representing the location on the touch surface where the pointer contact is made. The pointer position data that is output by the touch screen 152 is conveyed to a computer 156. The computer 156 executes one or more application programs and provides computer-generated image output that is displayed on the touch surface 160 via a projector 158. The touch screen 152, computer 156 and projector 158 form a closed-loop so that pointer contacts with the touch surface 160 can be recorded as writing or drawing or used to control execution of application programs executed by the computer 156. The computer-generated image output by the computer 156 is also updated to reflect the pointer activity.

When the computer 156 receives pointer position data from the touch screen 152, the computer also receives pointer type data from the camera 170. The camera 170 processes captured images in the same manner described above to determine the type of pointer used to contact the touch surface 160 that resulted in the pointer position data being generated. In this manner, the computer can process the pointer position and pointer type data in the appropriate manner. If desired, the captured images can be conveyed to the computer 156 for processing to determine pointer type.

Although touch systems which make use of image data to determine the type of pointer used to contact the touch surface have been described above, automatic pointer differentiation in touch systems employing active pointers can also be achieved. For example, in one such touch system an electromagnetic digitizer is placed behind an analog resistive touch sensitive screen. When a finger is used to contact the touch sensitive screen, only the touch sensitive screen generates pointer position data. However, when an active pointer is used to contact the touch sensitive screen, both the touch sensitive screen and the electromagnetic digitizer generate pointer position data. This difference in pointer position data output is used by the computer to allow contacts made on the touch surface of the touch sensitive screen using an active pen and a finger to be automatically differentiated. The signature of the active pen can be selected to specify its color allowing the computer to determine the color of the active pen used to contact the touch surface.

Alternatively, active radio frequency (RF) pens can be used with an analog resistive touch sensitive screen having a controller capable of recording the RFID tags broadcast by such pens when they are used to contact the touch surface. Since the controller of the touch sensitive screen receives pointer position data and an RFID tag when an RF pen is used to contact the touch surface but only receiving pointer position data when a finger is used to contact the touch surface, the computer is able to differentiate automatically between finger and RF pen contacts on the touch surface. The RFID tag can also be selected to specify the color of the RF pen. Active pens can also be used with a camera-based touch system.

As will be appreciated by those of skill in the art, the present invention is suitable for use in basically any environment where it is desired to distinguish between pointers used to contact a touch surface so that different functions can be invoked automatically without purposefully having to change the mode of operation. Such environments include for example, electronic whiteboards, touch liquid crystal display (LCD) panels, personal digital assistants (PDAs) and portable touch systems.

Although preferred embodiments of the present invention have been described, those of skill in the art will appreciate that variations and modifications may be made without departing from the spirit and scope thereof as defined by the appended claims.

What is claimed is:

1. A touch system comprising:
a touch surface to be contacted by a pointer;
at least one imaging device having a field of view looking generally across said touch surface; and
at least one processor communicating with said at least one imaging device and analyzing images acquired by said at least one imaging device to: (i) determine the type of pointer used to contact said touch surface; and (ii) determine the location on said touch surface where pointer contact is made, wherein during image analysis to determine pointer type, said at least one processor processes the acquired images to determine if at least one three-dimensional formation identifying the pointer type integral with and adjacent the end of the pointer exists and if so, further processes the acquired images to recognize said at least one three-dimensional formation thereby to detect said pointer type.

2. A touch system according to claim 1 wherein said at least one processor determines whether pointer contacts on said touch surface are made using a pen tool or a finger.

3. A touch system according to claim 2 wherein when pointer contacts on said touch surface are made using a pen tool, said at least one processor further determines whether a tip of said pen tool or a backend of said pen tool is used to contact said touch surface.

4. A touch system according to claim 3 wherein said at least one processor invokes a different function depending on whether said tip or backend is used to contact said touch surface.

5. A touch system according to claim 4 wherein when said at least one processor determines that said backend is used to contact said touch surface, said at least one processor invokes an erase function.

6. A touch system according to claim 4 wherein when said at least one processor determines that said tip is used to contact said touch surface, said at least one processor invokes a write function.

7. A touch system according to claim 6 wherein the at least one three-dimensional formation identifies the color of said pen tool.

8. A touch system according to claim 2 wherein when said at least one processor determines that a finger is used to contact said touch surface, said at least one processor invokes a mouse event.

9. A method of updating image data used to present a displayed image on a touch surface in response to pointer contact on said touch surface, said method comprising:
displaying an image on said touch surface;
generating pointer position data in response to pointer contact with said touch surface and acquiring images of pointers used to contact said touch surface;
calculating a sum along each row of pixels in the images to generate a horizontal intensity profile of the pointer within the images and processing the horizontal intensity profile to determine the type of pointer used to contact the touch surface, the pointer type being selected from one of a pen tool and a finger; and
updating image data used to present the displayed image on said touch surface based on the generated pointer position data and the determined type of pointer, wherein when the determined type of pointer is a pen tool, the images are further analyzed to determine whether a tip or a backend of said pointer is used to contact said touch surface and wherein when a tip is used to contact said touch surface, the images are further analyzed to determine a color assigned to said pen tool.

10. The method of claim 9 wherein when the backend is used to contact said touch surface, an editing function is performed during said updating.

11. The method of claim 9 wherein when a tip is used to contact said touch surface, a write function is performed during said updating.

12. The method of claim 9 wherein during said further analysis, the shape of said tip is examined to determine the color assigned to the pen tool.

13. The method of claim 9 wherein during said further analysis, a glyph on said tip is recognized to determine the color assigned to the pen tool.

14. A touch system comprising:
a touch surface on which an image is presented;
a processor responsive to pointer contacts on the touch surface and generating image data that is used to present said image; and
at least one camera to acquire images of said pointer, wherein said processor examines said images to generate a horizontal intensity profile representing said pointer and process the horizontal intensity profile to determine at least the shape of said pointer thereby to determine whether said pointer is a pen tool or a finger and updates the image data based on the type of pointer and the pointer activity on the touch surface, wherein one end of said pen tool has a generally conical tip and constitutes a writing tool and wherein said tip includes a unique identifier, when a writing tool is used to contact said touch surface, said processor examining said images to recognize said identifier and thereby determine another attribute assigned to the writing tool.

15. A touch system according to claim 14 wherein said processor edits said image data when said pointer is a pen tool and invokes a mouse event when said pointer is a finger.

16. A touch system according to claim 15 wherein said processor examines the orientation of the sides of said pointer to determine if the pointer is a pen tool or finger.

17. A touch system according to claim 14 wherein when said pointer is a finger, said processor updates the image data in accordance with an invoked mouse event.

18. A camera-based touch system comprising;
a pair of cameras having overlapping fields of view encompassing an area on which pointer contacts are to be made, said cameras acquiring images and generating corresponding image data;
a processor receiving and processing the image data generated by said cameras to determine the location of a pointer relative to the area when the pointer is captured in images acquired by the cameras and analyzing the image data to generate a horizontal intensity profile of said pointer and processing the horizontal intensity profile to determine the type of pointer used to contact the area, said pointer type being selected from one of a pen tool and a finger; and
a plurality of different pen tools, each pen tool having a unique three-dimensional tip configuration specifying an attribute assigned to said pen tool, wherein when said processor determines that the tip of one of said pen tools is used to contact said area, said processor further analyzes said acquired images to recognize the unique three-dimensional configuration of said tip.

19. A touch system according to claim 18 wherein an image is presented on said area, said processor updating image data used to generate the image presented on said area in accordance with the locations where contacts are made on the area and the determined type of pointer.

20. A touch system according to claim 18 wherein when said processor determines that the tip of one of said pen tools is used to contact said area, said processor uses said pointer position data to invoke a write function.

21. A touch system according to claim 18 wherein the unique three-dimensional configuration is a unique longitudinal tip shape and wherein said assigned attribute is a pen tool color, when said processor determines that the tip of one of said pen tools is used to contact said area, said processor uses said pointer position and the recognized tip shape to invoke a write function in the color assigned to said pen tool.

22. A touch system according to claim 18 wherein the unique three-dimensional configuration is at least one integral formation on said tip and wherein said assigned attribute is a pen tool color, when said processor determines that the tip of one of said pen tools is used to contact said area, said processor uses said pointer position data and the recognized at least one formation to invoke a write function in the color assigned to said pen tool.

23. A touch system according to claim 18 wherein when said processor determines that a finger is used to contact said area, said processor uses said pointer position data to invoke a mouse event.

24. A touch system comprising:
   a touch surface to be contacted by a pointer;
   at least one imaging device having a field of view looking generally across said touch surface;
   at least one processor communicating with said at least one imaging device and analyzing images acquired by said at least one imaging device to: (i) determine the type of pointer used to contact said touch surface; and (ii) determine the location on said touch surface where pointer contact is made; and
   a plurality of different pen tools, each pen tool having a unique three-dimensional tip configuration, wherein when said at least one processor determines that a tip of one of said pen tools is used to contact said touch surface, said at least one processor further analyzes said images to recognize the unique three-dimensional tip configuration of said one pen tool.

25. A touch system according to claim 24 wherein the shape of each pen tool tip has an invariant property irrespective of the orientation of the pen tool and wherein said at least one processor examines the invariant property to determine the pen tool used to contact the touch surface.

26. A touch surface according to claim 25 wherein each pen tool has a generally conical tip shape defining an opening angle, the opening angle of the tip being different for each pen tool and constituting said unique three-dimensional tip configuration.

27. A touch surface according to claim 26 wherein said at least one processor examines said images to determine the curve of growth of the sides of the tip and uses the determined curve of growth to determine the pen tool.

28. A touch system according to claim 24 wherein the unique three-dimensional tip configuration is at least one integral formation on said tip that is unique to each pen tool.

29. A touch system according to claim 28 wherein each pen tool is assigned a different color, when said at least one processor determines that said tip is used to contact said touch surface, said at least one processor uses said pointer position data and the recognized formation to invoke a write function in the color assigned to said pen tool.

30. A method of updating image data used to present a displayed image on a touch surface in response to pointer contact on said touch surface, said method comprising the steps of:
   displaying an image on said touch surface;
   generating pointer position data in response to pointer contact with said touch surface and acquiring images of pointers used to contact said touch surface;
   analyzing the acquired images to determine the type of pointer used to contact the touch surface; and
   updating image data used to present the displayed image on said touch surface based on the generated pointer position data and the determined type of pointer, wherein when a tip of a pointer is used to contact said touch surface, the images are further analyzed to determine a color assigned to said pen tool, said determined color being based on a recognized three-dimensional pen tool tip configuration.

31. The method of claim 30 wherein when said tip is used to contact said touch surface, a write function is performed during said updating.

32. The method of claim 30 wherein during said further analysis, a formation on said tip is recognized to determine the color assigned to the pen tool.

33. A touch system comprising:
   a touch surface to be contacted by at least one of a finger and a pen tool, said pen tool having a unique three-dimensional tip configuration;
   at least one imaging device having a field of view looking generally across said touch surface; and
   at least one processor communicating with said at least one imaging device and analyzing images acquired by said at least one imaging device to: (i) determine the type of pointer used to contact said touch surface; and (ii) determine the location on said touch surface where pointer contact is made, wherein when said at least one processor determines that a tip of a pen tool is used to contact said touch surface, said at least one processor further analyzes said images to recognize the unique three-dimensional configuration of said pen tool tip.

34. A touch system according to claim 33 wherein the shape of said pen tool tip has an invariant property irrespective of the orientation of the pen tool and wherein said at least one processor examines the invariant property to determine the pen tool used to contact the touch surface.

35. A touch surface according to claim 34 wherein the tip shape is conical defining an opening angle, the opening angle of the tip being different for different pen tools and constituting said unique three-dimensional configuration.

36. A touch surface according to claim 35 wherein said at least one processor examines said images to determine the curve of growth of the sides of the tip and uses the determined curve of growth to determine the pen tool.

37. A touch system according to claim 33 wherein the unique three-dimensional configuration is at least one integral formation on said tip that is unique to said pen tool.

38. A touch system according to claim 37 wherein the at least one formation identifies the color of said pen tool.

39. An interactive input system comprising:
   at least one imaging device having a field of view looking into a region of interest into which at least one pointer is positioned; and
   processing structure communicating with said at least one imaging device and analyzing images acquired by said at least one imaging device to: (i) determine the type of the at least one pointer; and (ii) determine the location of the at least one pointer in said region of interest, wherein during image analysis to determine pointer type, said processing structure processes the acquired images to recognize the three-dimensional configuration of the pointer tip.

40. An interactive input system according to claim 39 wherein the tip configuration of said at least one pointer has an invariant property irrespective of the orientation of the pen tool and wherein said processing structure examines the invariant property to determine the type of said at least one pointer.

41. An interactive input system according to claim 40 wherein the tip is conical defining an opening angle, the opening angle of the tip being different for different pointers.

42. An interactive input system according to claim 39 wherein the three-dimensional configuration comprises at least one three-dimensional integral formation, the at least one formation being different for different pointers.

43. An interactive input system according to claim 42 wherein the at least one formation identifies the color of said pointer.

\* \* \* \* \*